Patented Feb. 25, 1930

1,748,315

UNITED STATES PATENT OFFICE

FRITZ STOEWENER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ACTIVE SILICA

No Drawing. Application filed March 4, 1926, Serial No. 92,362, and in Germany December 8, 1924.

For the manufacture of active silica, or silica gel, it is usual to decompose solutions of silicates or solid silicates or other silicon compounds such as silicon tetra-chlorid, silicon fluorid and the like, by means of acids or water (hereinafter for brevity referred to as "decomposing media") which are employed under suitable conditions as to quantities and concentrations to first produce sols which solidify after some time. Thereupon the jelly so obtained is washed and slowly dried, or water is removed from it prior to any purification whereupon the jelly is washed and then dried completely. Jellies having set too rapidly for example already during the decomposition, are generally, after being worked up, coarse-porous and of rather small hardness.

All known processes for the manufacture of active silica have the disadvantage that the sol contains only comparatively small amounts of free silica. The sols and the jellies obtained therefrom by setting, mostly contain between 1 and 8.5 per cent, by volume, of $SiO_2$ calculated on the amount of liquid. The use of jellies containing such small quantities of $SiO_2$ is very disadvantageous as is the use of a large excess of one of the components participating in the decomposition.

I have now found that the said process can be carried out much more economically and with the formation of products of high adsorbing power by adding the silicate solutions or solid silicates or other decomposable silicon compounds such as silicon tetra-chlorid and so on to the decomposing medium while employing such quantities and concentrations as to produce non-alkaline sols containing at least 9 grammes of silica ($SiO_2$) in each 100 cubic centimetres of the liquid. When preparing the product by decomposition of alkali silicate the decomposing acid must be employed in at least an amount sufficient to neutralize the alkali. If in the usual manner the acid would be added to the silicon compound part of the silica would separate prematurely in flakes and the solution would be accordingly poorer in silicic acid, or when slowly introducing the acid, the alkaline mixture would suddenly set to a strongly alkaline jelly after adding part of the acid required. The sols prepared according to my present invention containing a high percentage of silica give an active silica gel remarkable for its high weight per unit of volume, great hardness and very fine pores, and equalling at least a silica obtained from low per cent sols. As regards the economy of the new process the use of high per cent sols is far superior to the process hitherto known.

For example, when starting on the one hand from a mixture containing 7 per cent, on the other hand from a mixture containing 14 per cent of $SiO_2$, the production of the same quantity of active silica requires only half the space, in the latter case, for effecting the decomposition as well as washing and only half the amount of heat for drying as compared with the 7 per cent mixture. The high per cent silica jellies are not slimy, but solid masses which can be readily filtered and washed. A further saving of time, volume and water results from this property. Also the losses of silica are considerably smaller in the new process. On drying, generally a very fine-pored gel excellently suitable for adsorbing gases and vapors is obtained. Accidental influences for example in washing and drying which might cause the formation of a larger pored mass, are of considerably smaller influence with the high per cent jellies employed according to the present invention than with jellies of a smaller percentage. However, the present invention allows also of obtaining hard active silica with larger pores as it is preferred for certain processes for example for refining oils, by washing the jelly with ordinary, slightly alkaline water with or without an addition of oils, colloids or substances having capillary activity and the like, instead of with distilled or slightly acid water which may be freed from oil and further purified with porous adsorbents. Oils, colloids or substances having capillary activity and the like may also be added to the sol or to the components serving for its preparation. Larger-pored products are also obtained by slightly pressing the jelly. On the other hand fine-pored gels are obtained by subjecting the jelly before or after washing it to high pressures in order to remove the bulk of the water, as usual for low per cent jellies.

The production of high per cent silica sols grows the more difficult the higher the contents of $SiO_2$ as the mass becomes more and more inclined to a complete or partial premature setting in the course of the decomposition. I have found that this difficulty can be avoided by effecting the decomposition at low temperatures i. e. temperatures above the freezing point of the mixture or its components, but below about 20° C.; in which cases the adsorbing power of the product is often increased.

The following examples will further illustrate how my invention may be carried out in practice, but the invention is not limited to these examples. The parts are by volume, unless otherwise stated.

Example 1

1000 parts of commercial sodium silicate solution of 1.152 specific gravity are caused to run into 126.5 parts of concentrated hydrochloric acid while vigorously stirring. A sol containing 12 grammes of $SiO_2$ in each 100 cubic centimetres is obtained which after standing for some hours has set to a clear transparent jelly, which is washed with distilled water, dried at from 70 to 120° C. or at a more elevated temperature and thereupon slowly heated to 300 or 400° C.

Instead of the components indicated above, the following ones may also be employed as further instances:

a. 1000 parts of a commercial sodium silicate solution of 1.152 specific gravity and 127 parts of nitric acid of 55 per cent.

b. 1000 parts of a commercial sodium silicate solution of 1.24 specific gravity and 915 parts of nitric acid of 16 per cent.

c. 1000 parts of a commercial sodium silicate solution of 1.16 specific gravity and 206 parts of sulfuric acid of 30 per cent.

d. 1000 parts of a commercial sodium silicate solution of 1.238 specific gravity and 890 parts of a waste sulfuric acid of 12.7 per cent.

Example 2

1000 parts of a commercial sodium silicate solution of 1.19 specific gravity cooled with ice are introduced into 248 parts of sulfuric acid of 30 per cent also cooled with ice, in the manner described in Example 1. The resulting sol contains 14 grammes of $SiO_2$ in each 100 cubic centimetres. Setting may be effected at ordinary or elevated temperature.

Example 3

100 parts, by weight, of powdered sodium aluminate silicate (artificial zeolite) are introduced in small portions and while stirring into 383 parts, by weight, of hydrochloric acid of 16 per cent at room temperature or better at a lower temperature, say 0° C. The resulting sol, 100 cubic centimetres of which contain 12 grammes of $SiO_2$, sets soon to a jelly which is worked up in the manner described in Example 1.

The silica gels obtained in accordance with the above examples while avoiding a considerable excess of acid or silicate, after being dried and heated, form glass-like grains of great hardness. A volume of 100 cubic centimetres of these gels (in grains of from 1.5 to 3 millimetres) is capable of adsorbing from 13 to 16 grammes of benzene from a gas containing 1 per cent, by volume, of benzene. The said gels are also very suitable for example for the purification of gaseous hydrochloric acid as it is obtained in the chlorination of organic compounds.

I claim:

1. A process of manufacturing active silica which consists in adding a thousand parts of sodium silicate solution of 1.152 specific gravity to 126.5 parts of concentrated hydrochloric acid with strong agitation below room temperature whereby a sol containing 12 grammes of $SiO_2$ in each 100 cubic centimetres is obtained, allowing the sol to set to a gel, washing the gel with distilled water, drying it and heating it.

2. As an article of manufacture, a non-alkaline silica sol containing at least 9 grammes of $SiO_2$ in each 100 cubic centimetres, and capable of setting to form a glass-like gel of great hardness, high weight per unit of volume and with high adsorption power.

In testimony whereof I have hereunto set my hand.

FRITZ STOEWENER.